(12) United States Patent
Tsubouchi et al.

(10) Patent No.: US 6,381,959 B1
(45) Date of Patent: May 7, 2002

(54) BRAKE MASTER CYLINDER

(75) Inventors: Kaoru Tsubouchi, Toyota; Toshihiro Nakano, Chiryu; Akimoto Okada, Anjo, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/714,182

(22) Filed: Nov. 17, 2000

(30) Foreign Application Priority Data

Nov. 17, 1999 (JP) .......................................... 11-327062

(51) Int. Cl.[7] ................................................ B60T 11/20
(52) U.S. Cl. ....................................................... 60/562
(58) Field of Search ........................................... 60/562

(56) References Cited

U.S. PATENT DOCUMENTS

| 5,046,315 A | * | 9/1991 | Nakamura et al. ............. 60/562 |
| 5,063,743 A | * | 11/1991 | Mori et al. .................... 60/562 |
| 5,431,014 A | | 7/1995 | Ishihara | |

FOREIGN PATENT DOCUMENTS

| JP | 5-17337 | 5/1993 |
| JP | 2560091 | 10/1997 |

* cited by examiner

*Primary Examiner*—F. Daniel Lopez
(74) *Attorney, Agent, or Firm*—Burns, Doane, Swecker & Mathis, LLP

(57) ABSTRACT

A brake master cylinder includes a cylinder housing formed by a cylinder body and a cap, a first guide member, a second guide member, a sleeve, a first piston and a second piston. To achieve accurate concentricity between a bore of the first guide member and a bore of the sleeve, and between a bore of the second guide member and the bore of the sleeve, the first guide member is coaxially provided in a bore of the cap, the second guide member is coaxially provided in the cylinder bore and has a first bore at its front side and a second bore at its rear side, and the sleeve is coaxially fitted into the bore of the cap at its rear end and is coaxially fitted into the second bore of the second guide member at its front end. The first piston is fitted into the cylinder housing and is slidably supported in the axial direction by the bore of the first guide member and the bore of the sleeve, the second piston is provided in front of the first piston coaxially and is slidably supported in the axial direction by the first bore of the second guide member and the bore of the sleeve.

15 Claims, 3 Drawing Sheets

BRAKE MASTER CYLINDER

This application is based on and claims priority under 35 U.S.C. §119 with respect to Japanese Application No. 11(1999)-327062 filed on Nov. 17, 1999, the entire content of which is incorporated herein by reference.

FIELD OF THE INVENTION

The present invention generally relates to a brake master cylinder for a automotive vehicle.

BACKGROUND OF THE INVENTION

Japanese Utility Model Examined Publication No. 2560091 discloses a brake master cylinder having a cylinder body in which is formed a rearward opening cylinder bore. A cap si fixed to the cylinder body at the front side of the cylinder bore to form a cylinder housing with the cylinder body. A first guide member is coaxially disposed in a bore of the cap, and a second guide member is provided in the cylinder bore. A sleeve is positioned in the bore of the cap, a first piston is inserted into the cylinder housing through the bore of the cap and is slidably supported in an axial direction by a bore of the first guide member and a bore of the sleeve, and a second piston is coaxially provided in front of the first piston and is slidably supported in an axial direction by a bore of the second guide member and the bore of the sleeve.

However, in the above-described brake master cylinder, the first guide member is fixed to the bore of the cap, but a rear side of the sleeve is put in the bore of the cap with an O-ring so that concentricity between the bore of the first guide member and the bore of the sleeve deteriorates. Accordingly, the movement of the first piston in the axial direction is not very smooth.

Moreover, with the brake master cylinder constructed in the above-described manner, the second guide member is fixed to the cylinder bore in front of the sleeve, but the sleeve does not engage with the cylinder bore. Thus, the concentricity between the bore of the second guide member and the bore of the sleeve deteriorates. Accordingly, movement of the second piston in the axial direction is also not very smooth.

In light of the foregoing, a need exists for an improved brake master cylinder that is not as susceptible to the disadvantages and drawbacks described above.

A need thus exists for a brake master cylinder whose pistons are bale to move in a relatively smooth manner in the axial direction.

SUMMARY OF THE INVENTION

According to one aspect of the present invention, a brake master cylinder includes a cylinder body having cylinder bore with an open rear end, a cap fixed to the cylinder body at an opening portion of the cylinder bore and forming a cylinder housing with the cylinder body, a first guide member coaxially provided in a bore of the cap, a second guide member coaxially provided in the cylinder bore and having a first bore at its front side and a second bore at its rear side, and a sleeve coaxially fitted into the bore of the cap at its rear end and coaxially fitted into the second bore of the second guide member at its front end. A first piston is fitted into the cylinder housing through the bore of the cap and is slidably supported in the axial direction by a bore of the first guide member and a bore of the sleeve. A second piston is provided in front of the first piston coaxially and is slidably supported in the axial direction by the first bore of the second guide member and the bore of the sleeve.

With the brake master cylinder of the present invention, the rear end of the sleeve is coaxially fitted into the bore of the cap and the first guide member is coaxially provided in the bore of the cap, and so concentricity between the bore of the first guide member and the bore of the sleeve can be accurately obtained. Thus, movement of the first piston in the axial direction is smooth. Also, the second guide member is coaxially provided in the cylinder bore and the front end of the sleeve is coaxially fitted into the second bore of the second guide member, and so accurate coaxial concentricity between the first bore of the second guide member and the bore of the sleeve is achieved. Smooth movement of the second piston in the axial direction is thus achieved.

In accordance with the brake master cylinder of the present invention, the sleeve has a front flange portion formed between the cap and the second guide member so that the sleeve is engaged and nipped by the cap and the second guide member at the front flange portion. Out-of-roundness of the bore of the sleeve is thus maintained relatively precise even if the axial force by the nipping is relatively large. Accordingly, movement of the pistons in the axial direction is smooth.

According to another aspect of the present invention, a brake master cylinder includes a cylinder body having a cylinder bore that is open at a rear end of the cylinder body, a cap having a bore and at least partially positioned in the cylinder bore to form a cylinder housing with the cylinder body, a first guide member coaxially positioned in the bore of the cap, a second guide member coaxially positioned in the cylinder bore, and a sleeve having a rear end coaxially fitted into the bore of the cap and a front end coaxially fitted into the bore of the second guide member. A first piston is slidably supported in the axial direction by the bore of the first guide member and the bore of the sleeve, and a second piston is located coaxially in front of the first piston and is slidably supported in the axial direction by the bore of the second guide member and the bore of the sleeve.

In accordance with another aspect of the invention, a brake master cylinder includes a cylinder body having a cylinder bore that is open at a rear end of the cylinder body, a cap provided with a bore and having a front end portion engaging the cylinder bore to secure the cap in place relative to the cap body, a first guide member having a bore and coaxially positioned in the bore of the cap, a second guide member provided with a bore and coaxially positioned in the cylinder bore, and a sleeve having a rear end coaxially fitted into the bore of the cap and a front end coaxially fitted into the bore of the second guide member. The sleeve is provided with a bore and is engaged by the cap and the second guide member so that the sleeve is axially held in place by the cap and the second guide member. A first piston is slidably supported in the axial direction by the bore of the first guide member and the bore of the sleeve, and a second piston is located coaxially in front of the first piston and slidably supported in the axial direction by the bore of the second guide member and the bore of the sleeve.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
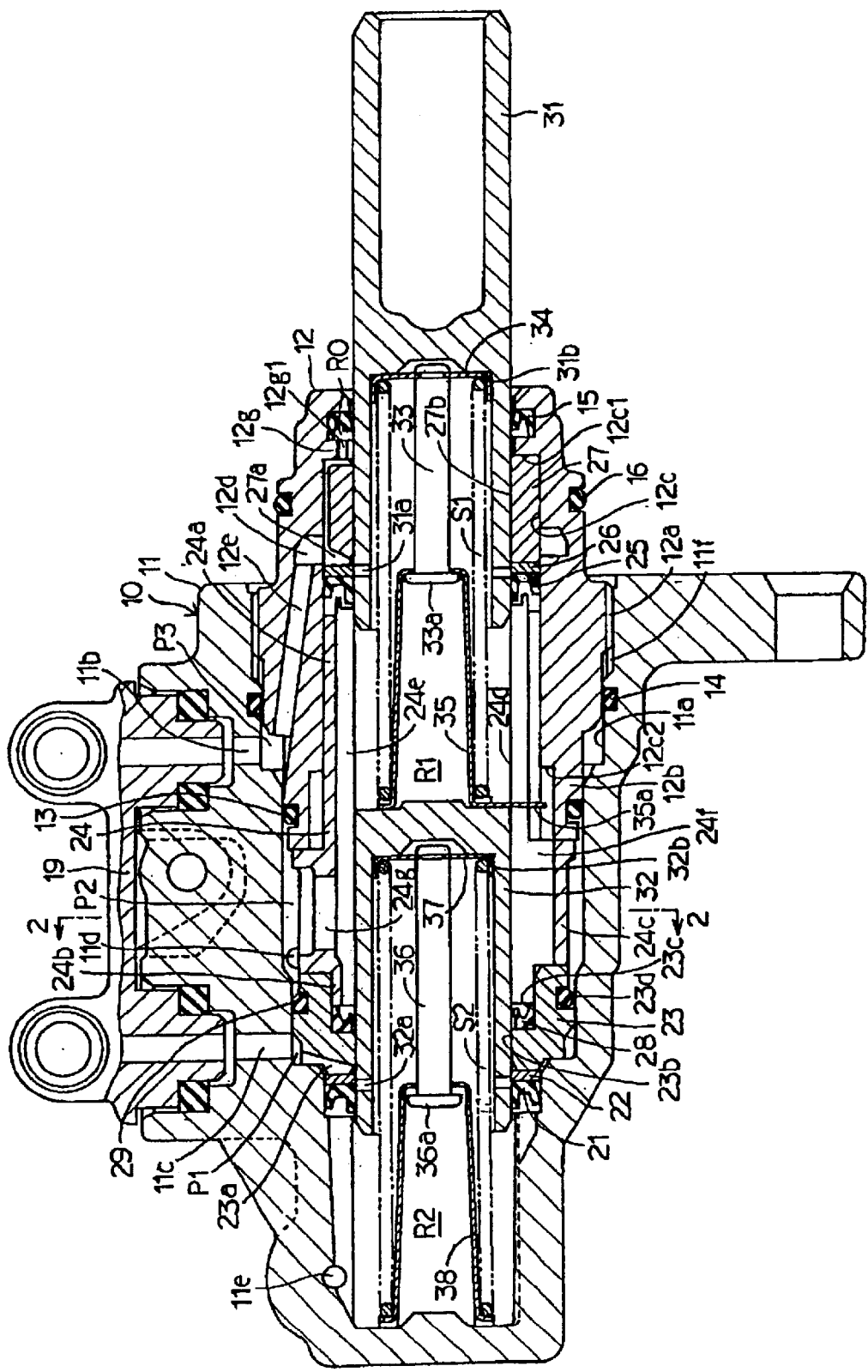
FIG. 1 is a vertical cross-section view of a brake master cylinder in accordance with a first embodiment of the present invention.

Referring initially to FIG. 1, the brake master cylinder according to one embodiment of the present invention is mainly comprised of a cylinder housing 10 which is composed of a body 11 and a cap 12, a seal cup 21 provided in the cylinder housing 10, a spacer 22, a second guide member 23, a sleeve 24, a seal cup 25, a spacer 26, a first guide member 27, a first piston 31 and a second piston 32.

The body 11 is made of metal and possesses a rearwardly opening stepped bore 11a, several reservoir connection ports 11b, 11c connected with a reservoir by a connector 19, several outlet ports 11d, 11e connected with wheel cylinders by brake pipes, and a female screw portion 11f formed at the open end portion of the stepped bore 11a.

The seal cup 21 is located in the stepped bore 11a in coaxial alignment with the spacer 22 and has a cup-shaped or recessed portion. The seal cup 21 provides a seal at one end of a pressure chamber R2 (second pressure chamber). The second pressure chamber R2 is located between the closed end of the body 11 and the second piston 32, and is connected with the outlet port 11e. The seal cup 21 provides a seal between the inner surface of the stepped bore 11a and the outer surface of the second piston 32.

The spacer 22 possesses a ring-shaped or annular configuration and is located between the seal cup 21 and the second guide member 23. The spacer 22 permits brake fluid to flow axially through the inner and the outer surfaces of the spacer 22, while preventing the seal cup 21 from cutting into a fluid communication groove 23a when pressure is generated in the second pressure chamber R2.

The cap 12 is made of metal and has a screw portion 12a (male screw portion) formed on its outer surface at a positioned intermediate the ends of the cap 12 (e.g., halfway along the axial extent of the cap 12) to threadably engage the screw portion 11f (female screw portion). The cap also includes a cylindrical portion 12b inserted into the stepped bore 11a and supporting a small diameter cylindrical portion 24a of the sleeve 24. Several O-rings 13, 14 are positioned between the outer peripheral surface of the cap 12 and the inner peripheral surface of the body 11 to provide a fluid-tight contact or seal between the cap 12 and the body 11.

An end of the cylindrical portion 12b prevents the seal cup 21, the spacer 22, the second guide member 23 and the sleeve which are inserted into the stepped bore 11a in coaxial alignment with one another from slipping out. A rear side step 12c1 of a stepped bore 12c prevents the seal cup 25, the spacer 26 and the first guide member 27 positioned in the stepped bore 12c of the cap 12 in coaxial alignment from slipping out.

The seal cup 25 has a cup-shaped recess or concave portion opening in the forward direction, and is in fluid-tight contact with the inner surface of the cap 12 and the outer surface of the first piston 31. The spacer 26 possess a ring-shaped or annular configuration and is provided between the seal cup 25 and the first guide member 27. The spacer 26 permits brake fluid to flow axially through the inner and outer surfaces of the spacer 26, and prevents the seal cup 25 from cutting into a fluid communication groove 27a when pressure is generated in a first pressure chamber R1 located between the first piston 31 and the second piston 32.

An annular seal cup 15 is positioned in a groove formed in the inner surface of the cap 12 at the rear end portion of the cap 12. An O-ring 13 is provided in the outer surface of the cap 12 and is in fluid-tight contact with the inner surface of the body 11 and the outer surface of the cap 12. Another O-ring 14 is provided in an annular groove formed in the inner peripheral surface of the stepped bore 11a of the body 11 and is located rearwardly relative to the O-ring 13. The O-ring 14 is in air-tight and fluid-tight contact with the inner surface of the body 11 and the outer surface of the cap 12.

A seal cup 15 is positioned in an annular groove which is formed in the cap 12 and is positioned rearwardly relative to the first guide member 27. The seal cup 15 has a cup-shaped concave or recessed portion opening in the forward direction and is in air-tight and fluid-tight contact with the inner surface of the cap 12 and the outer surface of the first piston 31. The O-ring 16 is provided in a annular groove which is formed in the outer surface of the cap 12 at the rear portion of the cap 12. The O-ring 16 is in air-tight contact with a housing of a brake booster (not illustrated) and the cap 12. The outer surface of the rear end of the cap 12 possesses a hexagonal configuration. By nipping and rotating this hexagonal portion, the cap 12 is set in the body 11 and released from the body 11.

The second guide member 23 is made of phenol resin and possesses an annular configuration. The second guide member 23 is formed with a fluid communication groove 23a, a small diameter bore 23b, a large diameter bore 23c and an annular groove 23d. The second guide member 23 is inserted into the stepped bore 11a. Plural of the fluid communication groove 23a inclined in the illustrated manner is formed on the front end of the second guide member 23 at predetermined circumferential intervals. The fluid communication groove 23a is set to be in fluid communication with the reservoir connection ports 11c by way of an annular passage P1 which is formed between the body 11 and the second guide member 23. The fluid communication groove 23a is set to be in fluid communication with a communication passage 32a which is formed in the second piston 32 by way of a clearance between the spacer 22 and the second piston 32.

The small diameter bore 23b is formed in the front inner surface of the second guide member 23 and slidably supports the second piston 32 for sliding movement in the axial direction. The large diameter bore 23c is formed in the rear inner surface of the second guide member 23. A seal cup 28 and a front small diameter cylindrical portion 24b of the sleeve 24 are positioned in the large diameter bore 23c. The seal cup 28, which has a cup-shaped concave or recessed portion opening in the rearward direction, is restricted to moving in the rearward direction by the front end of the sleeve 24 and is in fluid-tight contact with the inner surface of the second guide member 23 and the outer surface of the second piston 32.

The annular groove 23d is formed on the front outer surface of the second guide member 23. An O-ring 29 is positioned in the annular groove 23d and is in fluid-tight contact with the outer surface of the second guide member 23 and the inner surface of the body 11. The first pressure chamber R1 is sealed by the O-ring 29, the O-ring 13, the seal cup 25 and the seal cup 28.

The sleeve 24 is made of phenol resin and possesses an annular configuration. The sleeve 24 has a rear small diameter cylindrical portion 24a, a front small diameter cylindrical portion 24b and a half-way or intermediate large diameter cylindrical portion 24c. The rear small diameter cylindrical portion 24a is coaxially inserted into the stepped bore 12c with little clearance. The front small diameter cylindrical portion 24b is coaxially inserted into the large diameter bore 23c of the second guide member 23. The half-way large diameter cylindrical portion 24c is held between an inner step of the body 11 and a front end of the cylindrical portion 12b. A rear portion of an inner bore 24d of the sleeve 24 and an inner bore 27b of the first guide member 27 support the first piston 31 for slidable movement in the axial direction. A front portion of the inner bore 24d of the sleeve 24 and the small diameter bore 23b of the second guide member 23 support the second piston 32 for sliding movement in the axial direction. The sleeve 24 is formed with a communication groove 24e, a communication groove 24f and a communication passage 24g.

Figure 2:
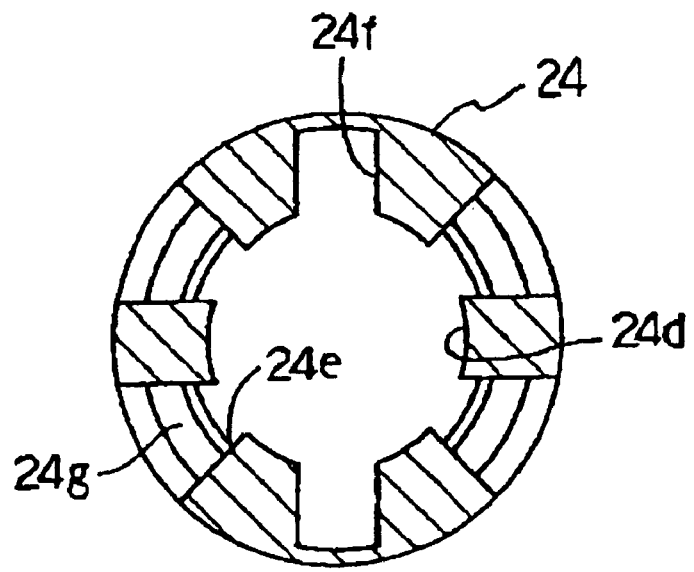
FIG. 2 is a cross-sectional view of the brake master cylinder shown in FIG. 1 taken along the section line 2—2 in FIG. 1.

The communication groove 24e is made up of four grooves which extend straight and along the inner surface of the sleeve 24 as shown in FIG. 2. The communication groove 24e establishes fluid communication between cup-shaped concave portions of the seal cups 25, 28 and the first pressure chamber R1 which is formed between the first piston 31 and the second piston 32. As shown in FIG. 2, the communication groove 24f is made up of two grooves which extend straight and along the inner surface of the sleeve 24. The communication groove 24f not only opens toward the outer surface and inner surface of the rear small diameter cylindrical portion 24a, but also opens in the axial direction at the end of the rear small diameter cylindrical portion 24a. The communication groove 24f not only opens toward the outer surface and inner surface of the front small diameter cylindrical portion 24b, but also opens in the axial direction at the end of the front small diameter cylindrical portion 24b.

The communication passage 24g is formed in the half-way large diameter cylindrical portion 24c. The communication passage 24g is provided in accordance with the communication groove 24e and in the radial direction. The communication passage 24g is not only set to be in fluid communication with the first pressure chamber R1 by way of the communication groove 24e, but is also set to be in fluid communication with the outlet ports lid by way of an annular passage P2 which is made up of the body 11, the cap 12, the second guide member 23 and the sleeve 24.

Figure 3:
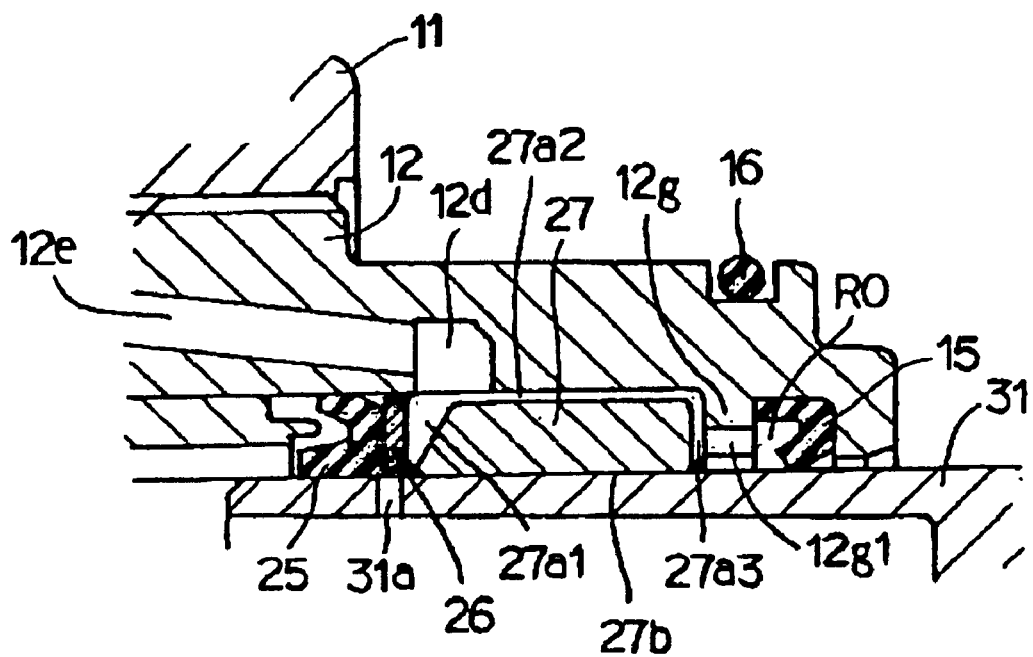
FIG. 3 is an enlarged cross-sectional view of a portion of the brake master cylinder shown in FIG. 1.

The first guide member 27 is made of phenol resin, possesses an annular configuration and is inserted into and positioned in the stepped bore 12c of the cap 12. The first guide member 27 is restricted from moving in the rearward direction when it abuts against an annular flange portion 12g which is formed between the seal cup 15 and the first guide member 27. The annular flange portion 12g is formed together with the cap 12 in an integral manner and extends radially inwardly. An inner surface diameter of the annular flange portion 12g is set to be slightly larger than the inner surface diameter of the first guide member 27. As shown in FIG. 1 and FIG. 3, the annular flange portion 12g has a notch or passage 12g1 which is set to be in fluid communication with a fluid chamber R0 that is formed between the rear end of the annular flange portion 12g and the seal cup 15.

A molded communication groove 27a is formed on the outer surface and both ends of the first guide member 27. As shown in detail in FIG. 3, the communication groove 27a is provided with a front groove portion 27a1 which is formed along the front end of the first guide member 27, an outer surface groove portion 27a2 which is formed on the outer surface of the first guide member 27 and extends in the axial direction, and a rear groove portion 27a3 which is formed along the rear end of the first guide member 27. Plural of the communication groove 27a is formed at predetermined circumferential intervals.

As shown in more detail in FIG. 3, the front groove portion 27a1 of the communication groove 27a forms a communication passage with the spacer 26 provided close to the rear side of the seal cup 25. The communication groove 27a1, at the outer side, is set to be in fluid communication with the reservoir connection ports 11b by way of an annular groove 12d, a communication passage 12e being formed in plural at predetermined circumferential intervals, and an annular passage P3 formed between the body 11 and the cap 12. The communication groove 27a1, at the inner side, is set to be in fluid communication with a communication passage 31a provided in the first piston 31 by way of a clearance between the spacer 26 and the first piston 31. The outer surface groove portion 27a2 of the communication groove 27a is set to be in fluid communication with the notch or hole 12g1 by way of the rear groove portion 27a3. The fluid chamber R0 formed by the seal cup 15 is set to be in fluid communication with the communication groove 27a1 of the first guide member 27 and the annular groove 12d of the cap 12 by way of the notch 12g1 and the rear groove portion 27a3.

The bottom diameter of the annular groove 12d is larger than the outer surface diameter of the seal cup 25. The annular groove 12d is provided close to the rear side of the seal cup 25. The rear side of the bottom of the annular groove 12d is formed as a tapering shape having a front side diameter larger than its rear side diameter. The annular groove 12d opens toward the inner surface of the cap 12 and is set to be in fluid communication with the communication groove 27a of the first guide member 27. The communication passage 12e is bored or extends from the outer surface of the cap 12 to the front side of the annular groove 12d and is inclined upwardly towards the annular passage P3. The communication passage 12e establishes fluid communication between the annular groove 12c1 and the annular passage P3. The above layout of the communication passage 12e constitutes an effective way to set the reservoir connection ports 11b ahead or forward of the first guide member 27 and thus makes the brake master cylinder compact.

The front side of the annular passage P3 is cut off from the first pressure chamber by fluid-tight contact between the body 11 and the cap 12 with the O-ring 13 provided in the cap 12. The rear side of the annular passage P3 is cut off from the atmosphere by air-tight and fluid-tight contact between the body 11 and the cap 12 by virtue of the O-ring 14 which is provided in the cap 12 and has a larger outer diameter than the O-ring 13.

The first piston 31 is made of metal and is inserted into the cylinder housing 10 through the cap 12. The first piston 31 is slidably supported in the axial direction by the inner bore 24d of the sleeve 24 and an inner bore 27b of the first guide member 27. The first piston 31 is urged to the right in FIG. 1 by a first spring S1 provided between the first piston 31 and the second piston 32. The distance between the first piston 31 and the second piston 32 is defined by a first rod 33, a first retainer 34 and a first spring retainer 35.

The first rod 33 is made of metal, is fixed to the first piston 31 by the first retainer 34 and is able to move in the axial direction with the first piston 31. The first retainer 34 is made of metal and is used as both a spring retainer for the first spring S1 and a retainer. The first retainer 34 is fixed to the rear end of the first rod 33 and is positioned in a concave or recessed portion 31b of the first piston 31 by force fit.

The first spring retainer 35 is made of metal and is provided between the first spring S1 and the second piston 32. The first spring retainer 35 has a projection 35a extending in the radial direction at its front end and engages with a head portion 33a of the first rod 33 at the rear end of the first rod 33. The projection 35a extends to a large diameter portion of the stepped bore 12c through the communication groove 24e of the sleeve 24 and is opposed to the rear side step 12c2 of the stepped bore 12c with a predetermined clearance. The projection 35a is adapted to engage the rear side step 12c2 when the first piston 31 and/or the second piston 32 move rearward.

The second piston 32 is made of metal and is positioned in coaxial alignment with the first piston 31. The second piston 32 is supported slidably in the axial direction by the inner bore 24d of the sleeve 24 and an inner bore 23b of the second guide member 23. The second piston 32 is urged to the right in FIG. 1 by a second spring S2 positioned between the body 11 and the second piston 32. The distance between the body 11 and the second piston 32 is defined by a second rod 36, a second retainer 37 and a second spring retainer 38.

The second rod 36, which is made of metal, is fixed to the second piston 32 by the second retainer 37 and is able to move in the axial direction with the second piston 32. The second retainer 37, which is also made of metal, is used as both a spring retainer for the second spring S2 and a retainer. The second retainer 37 is fixed to the rear end of the second rod 36 and in a concave or recessed portion 32b of the first second piston 32 by force fit.

The second spring retainer 38 is made of metal and is positioned between the second spring S2 and the body 11. The rear end of the second spring retainer 38 opposes a head portion 36a of the second rod 36 with a predetermined clearance. This clearance is smaller than one between the projection 35a of the first spring retainer 35 and the rear side step 12c2 of the cap 12. Accordingly, the projection 35a of the first spring retainer 35 is not engaged with the large stepped portion 12c2 of the cylinder cap 12 until the second spring S2 expands to the length defined by the second rod 36, the second retainer 37, and the second spring retainer 38 of the second spring S2.

The rearward movement of the first piston 31, the first rod 33, the first retainer 34, the first spring retainer 35, the second piston 32, the second rod 36, the second retainer 37 and the second spring retainer 38 causes the projection 35a of the first spring retainer 35 to engage the rear side step 12c2 of the cap 12 when the assembled brake master cylinder is transported by, for example, a truck. However, the first piston 31 and the second piston 32 are adjusted to be placed at the position as a retreat limit as shown in FIG. 1 when the brake master cylinder is installed in a body of an vehicle.

In the first embodiment, the rear small diameter cylindrical portion 24a of the sleeve 24 and the first guide member 27 are coaxially inserted into the stepped bore 12c of the cap 12 so that concentricity between the inner bore 27b which slidably supports the first piston 31 in the axial direction and the inner bore 24d of the sleeve 24 is made more accurate. Accordingly, the first piston 31 can move smoothly in the axial direction.

The front small diameter cylindrical portion 24b is coaxially inserted into the large diameter bore 23c of the second guide member 23 so that concentricity between the small diameter bore 23b which slidably supports the second piston 32 in the axial direction and the inner bore 24d of the sleeve 24 can be more accurately. Accordingly, the second piston 32 can move smoothly in the axial direction.

In the first embodiment, the sleeve 24 is nipped by the cap 12 and the second guide member 23 at the half-way large diameter cylindrical portion 24c in the axial direction. Thus, the compressive deformation of the half-way or intermediate large diameter cylindrical portion 24c have little effect on the accuracy of the inner bore 24d of the sleeve 24, even if the half-way large diameter cylindrical portion 24c is nipped with an excessive force such as that generated by the cap 12 when screwed into the body 11 with an excessive torque. Accordingly, the shape of the inner bore 24d of the sleeve 24 is maintained more precisely and the first piston 31 and the second piston 32 can move smoothly in the axial direction.

In the first embodiment, the first guide member 27 and the seal cup 25 are coaxially inserted into the stepped bore 12c of the cap 12 so that concentricity between the first guide member 27 and the seal cup 25 can be relatively easily made more accurate. Also, the concentricity between the first piston 31 which is supported by the sleeve 24 and the first guide member 27 and the seal cup 25 is made more accurate. Accordingly, the reliability of the fluid-tight contact between the first piston 31 and the seal cup 25 is increased. In the stepped bore 12c of the cap 12, the diameter of the portion in which the first guide member 27 is provided is equivalent or equal to the diameter of the portion in which the seal cup 25 is provided. Thus boring the cap 12 is relatively easy and concentricity between the first guide member 27 and the seal cup 25 is made more accurate. Accordingly, concentricity between the first piston 31 and the seal cup 25 is made more accurate.

The sleeve 24 is nipped by the body 11 and the cap 12 screwed into the body 11 at the half-way large diameter cylindrical portion 24c. Therefore, thermal change on the span of the sleeve 24 has little effect on the screw portion of the body 11 and the cap 12. The screw portion of the body 11 and the cap 12 are thus not as susceptible to becoming loose. The small diameter cylindrical portion 24a of the sleeve 24 does not engage the first guide member 27 so that excessive force which is generated by the cap 12 screwed into the body 11 with excessive torque does not act on the small diameter cylindrical portion 24a (which is one of the weakest portions in the sleeve 24) and the first guide member 27. Accordingly, the sleeve 24 and the first guide member 27 can be made of low strength material and the cost of theses parts can be reduced.

The brake master cylinder is installed in the body of a vehicle and brake fluid is filled up in the cylinder housing 10. Thereafter, the communication passage 31a of the first piston 31 passes the seal cup 25 with movement of the first piston 31 in the left direction in FIG. 1 so that fluid communication between the first pressure chamber R1 and the reservoir connection port 11b is interrupted and the pressure in the first pressure chamber R1 rises. At this time, the communication passage 32a of the second piston 32 passes the seal cup 21 with movement of the second piston 32 in the left direction in FIG. 1 so that fluid communication between the second pressure chamber R2 and the reservoir connection port 11e is interrupted and the pressure in the second pressure chamber R2 rises.

Accordingly, pressured fluid in the first pressure chamber R1 is supplied to the outlet ports 11d connected to the wheel cylinders and pressured fluid in the second pressure chamber R2 is supplied to the outlet ports 11e connected to the wheel cylinders so that the braking operation is obtained. At this time, the force generated by the pressure in the first pressure chamber R1 acts on the first guide member 27. However, the force is received by the annular flange portion 12g of the cap 12 and so the first guide member 27 is restricted from moving in the rearward direction.

The inner surface diameter of the annular flange portion 12g is set to be slightly larger than the inner surface diameter of the first guide member 27 and smaller than the outer surface diameter of the seal cup 15 which is provided in the rear side of the first guide member 27 and accomplishes fluid-tight contact between the cap 12 and the first piston 31. The annular flange portion 12g can thus engage the rear side of the first guide member 27 with enough area for engagement. This relationship among the dimensions of the parts prevents excess deformation compression on the rear side of the first guide member 27 and excessive deformation on the inner surface of the first guide member 27. Accordingly, the first guide member 27 can be made of low strength material and the cost of the first guide member 27 is reduced.

The inner surface diameter of the annular flange portion 12g is set to be slightly larger than the inner surface diameter of the first guide member 27 so that the inner surface of the annular flange portion 12g does not contact the outer surface of the first piston 31. Accordingly, the cap 12 can be made without requiring precise boring and without requiring surface treatment for wear resistance, and so the cost of the cap 12 is reduced.

In addition, in the master brake cylinder of the present invention, residual air in the fluid chamber R0 can be discharged by fluid communication between the fluid chamber R0 and the front groove portion 27a1 through the notch or hole 12g1, the rear groove portion 27a3 and the outer surface groove portion 27a2.

In this version of the present invention, the first guide member 27 is made of phenol resin and the communication groove 27a provided by the front groove portion 27a1, the outer surface groove portion 27a2 and the rear groove portion 27a3 is made by molding. Accordingly, the first guide member 27 can be made without boring and surface treatment for wear resistance, and the cost of the first guide member 27 is thus reduced.

During the air removal operation performed upon installing the brake master cylinder in a vehicle, brake fluid flows from the reservoir connection port 11b to the first pressure chamber R1 through the annular passage P3, the communication passage 12e, the annular groove 12d, the communication groove 27a and the communication passage 31a. Brake fluid in the annular passage P3 and the communication passage 12e can reliably arrive in the communication passage 31a over the communication groove 27a because the annular groove 12d is formed around the communication groove 27a. Accordingly, residual air in the annular passage P3 and the communication passage 12e can be reliably discharged through the communication groove 27a, the communication passage 31a, the first pressure chamber R1 and the outlet ports.

Even if air remains at the communication passage 12e, the annular groove 12d and the communication groove 27a, the residual air can be reliably discharged to the reservoir through the annular passage P3 and the reservoir connection port 11b because the communication passage 12c is formed as an upwardly inclined passage.

In the first embodiment, the passages for fluid communication in the cap 12 include the annular groove 12d and the communication passage 12e. The annular groove 12d can be easily made by internal grooving and the communication passage 12e which does not require accurate circumferential positioning can be easily made by drilling so that the cost of manufacture is reduced.

Further, in this embodiment of the brake master cylinder, the distance between the front side wall of the annular groove 12d and the rear side of the seal cup 25 is such that suction performance, which means how smoothly the brake fluid is sucked or drawn in the first pressure chamber R1 through the outer lip of the seal cup 25 during the air removal operation, is good, even though the first piston retreats rearward relatively fast and a vacuum is created in the first pressure chamber R1 upon the air removal operation.

Further, the bottom of the annular groove 12d is formed as a tapered bore whose the front side diameter is larger than its rear side diameter. Thus, fluid flow is smooth at the tapered portion. Accordingly, the fluidity of brake fluid from the communication passage 12e to the communication groove 27a comes is good and residual air is smoothly discharged from the communication groove 27a to communication the passage 12e through the annular groove 12d.

Figure 4:
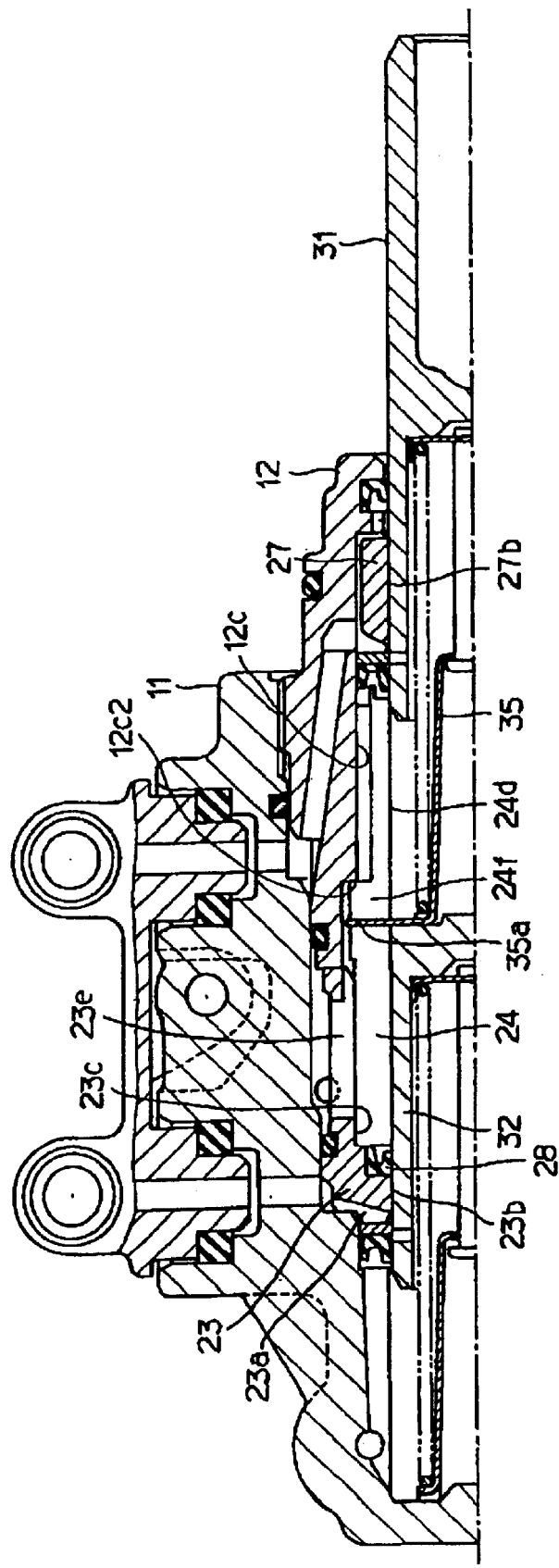
FIG. 4 is a vertical cross-sectional view of a brake master cylinder in accordance with a second embodiment of the present invention.

A second embodiment of the brake master cylinder is shown in FIG. 4. As shown in FIG. 4, the sleeve 24 is coaxially inserted into the stepped bore 12c of the cap 12 at its rear side and the large diameter bore 23c of the second guide member 23 at its front side. The second guide member 23 indirectly engages the rear side step 12c2 of the cap 12 through the sleeve 24 at the step of the large diameter bore 23c and directly engages with the front side face of the cap 12 at its rear side face. Accordingly, the force which is generated by the cap 12 screwed into the body 11 is directly transmitted to the second guide member 23 and indirectly transmitted to the second guide member 23 through the sleeve 24. The construction of the embodiment of the brake master cylinder shown in FIG. 4 is equivalent to the embodiment shown in FIGS. 1–3 and described above, except for the communication passage 24e corresponding to the communication passage 24g of the sleeve 24.

In the second embodiment shown in FIG. 4, concentricity between the inner bore 27b which slidably supports the first piston 31 for sliding movement in the axial direction and the inner bore 24d of the sleeve 24 can be relatively easily made more accurate and so the first piston 31 can move smoothly in the axial direction. Concentricity between the small diameter bore 23b which slidably supports the second piston 32 for sliding movement in the axial direction and the inner bore 24d of the sleeve 24 is also relatively easily made more accurate so that the second piston 32 can move smoothly in the axial direction. Also, the force which is generated by the cap 12 screwed into the body 11 and transmitted to the sleeve 24 is smaller than in the case of the first embodiment shown in FIG. 1, and concentricity between the sleeve 24 and the guide members is improved relative to the first embodiment shown in FIG. 1.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake master cylinder comprising:
a cylinder body having a cylinder bore possessing an open rear end;
a cap fixed to the cylinder body at an opening portion of the cylinder bore and forming a cylinder housing with the cylinder body, the cap including a bore;
a first guide member coaxially positioned in the bore of the cap;
a second guide member coaxially positioned in the cylinder bore and having a first bore at its front side and a second bore at its rear side;
a sleeve having a rear end coaxially fitted into the bore of the cap and a front end coaxially fitted into the second bore of the second guide member, the sleeve having a front flange portion formed between the cap and the second guide member, and the front flange portion being held in the axial direction between the cap and the second guide member;
a first piston fitted into the cylinder housing through the bore of the cap and being slidably supported in the axial direction by a bore of the first guide member and a bore of the sleeve; and
a second piston located coaxially in front of the first piston and slidably supported in the axial direction by the first bore of the second guide member and the bore of the sleeve.

2. The brake master cylinder as set forth in claim 1, wherein the sleeve includes a first communication groove, a second communication groove and a communication passage.

3. The brake master cylinder as set forth in claim 2, wherein the first communication groove is fluidly communicated with a first pressure chamber formed between the first and second pistons.

4. The brake master cylinder as set forth in claim 3, wherein the communication passage is fluidly communicated with the first pressure chamber by way of the first communication groove.

5. The brake master cylinder as set forth in claim 3, wherein the first communication groove is comprised of a plurality of grooves extending along an inner surface of the sleeve.

6. A brake master cylinder comprising:
a cylinder body having a cylinder bore that is open at a rear end of the cylinder body;
a cap at least partially positioned in the cylinder bore to form a cylinder housing with the cylinder body, the cap including a bore;
a first guide member coaxially positioned in the bore of the cap, the first guide member having a bore;
a second guide member coaxially positioned in the cylinder bore and having a bore;
a sleeve having a rear end coaxially fitted into the bore of the cap and a front end coaxially fitted into the bore of the second guide member, the sleeve having a bore, the sleeve having a front flange portion formed between the cap and the second guide member, the front flange portion being held between the cap and the second guide member in the axial direction;
a first piston slidably supported in the axial direction by the bore of the first guide member and the bore of the sleeve; and
a second piston located coaxially in front of the first piston and slidably supported in the axial direction by the bore of the second guide member and the bore of the sleeve.

7. The brake master cylinder as set forth in claim 6, wherein the sleeve includes a first communication groove, a second communication groove and a communication passage.

8. The brake master cylinder as set forth in claim 7, wherein the first communication groove is fluidly communicated with a first pressure chamber formed between the first and second pistons.

9. The brake master cylinder as set forth in claim 8, wherein the communication passage is fluidly communicated with the first pressure chamber by way of the first communication groove.

10. The brake master cylinder as set forth in claim 7, wherein the first communication groove is comprised of a plurality of grooves extending along an inner surface of the sleeve.

11. The brake master cylinder as set forth in claim 6, including one seal positioned between an inner surface of the bore of the second guide member and an outer surface of the second piston, and another seal positioned between an inner surface of the bore in the cap and an outer surface of the first piston, the one seal being located at one end of the sleeve and the another seal being located at an opposite end of the sleeve.

12. A brake master cylinder comprising:
a cylinder body having a cylinder bore that is open at a rear end of the cylinder body;
a cap having a front end portion engaging the cylinder bore to secure the cap in place relative to the cylinder body, the cap including a bore;
a first guide member coaxially positioned in the bore of the cap, the first guide member having a bore;
a second guide member coaxially positioned in the cylinder bore and having a bore;
a sleeve having a rear end coaxially fitted into the bore of the cap and a front end coaxially fitted into the bore of the second guide member, the sleeve having a bore, the sleeve being engaged by the cap and the second guide member so that the sleeve is axially held in place by the cap and the second guide member, the sleeve having a flange portion that is engaged by the cap and the second guide member;
a first piston slidably supported in the axial direction by the bore of the first guide member and the bore of the sleeve; and
a second piston located coaxially in front of the first piston and slidably supported in the axial direction by the bore of the second guide member and the bore of the sleeve.

13. The brake master cylinder as set forth in claim 12, wherein the sleeve includes a first communication groove, a second communication groove and a communication passage.

14. The brake master cylinder as set forth in claim 13, wherein the first communication groove is fluidly communicated with a first pressure chamber formed between the first and second pistons.

15. The brake master cylinder as set forth in claim 12, including one seal positioned between an inner surface of the bore of the second guide member and an outer surface of the second piston, and another seal positioned between an inner surface of the bore in the cap and an outer surface of the first piston, the one seal being located at one end of the sleeve and the another seal being located at an opposite end of the sleeve.

* * * * *